Nov. 16, 1965 G. W. LEWIS 3,218,022
ADJUSTABLE SOLENOID OPERATED VALVE
Original Filed May 12, 1960 2 Sheets-Sheet 1
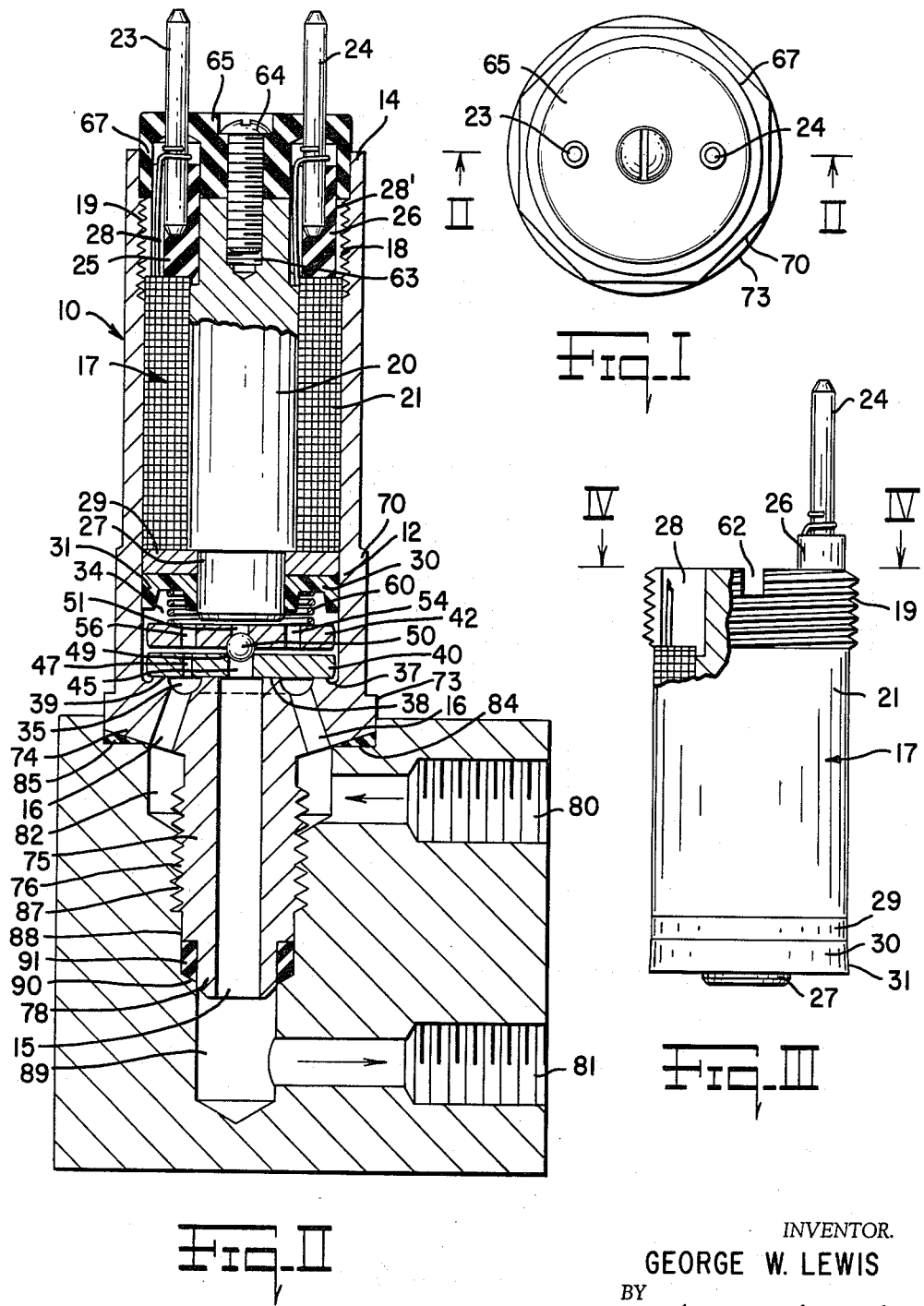
INVENTOR.
GEORGE W. LEWIS
BY
Falvey, Souther & Stoltenberg.
ATTORNEYS Nov. 16, 1965  G. W. LEWIS  3,218,022
ADJUSTABLE SOLENOID OPERATED VALVE
Original Filed May 12, 1960  2 Sheets-Sheet 2
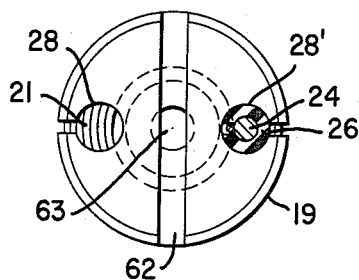
Fig. IV
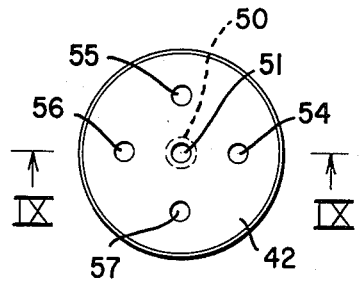
Fig. VIII
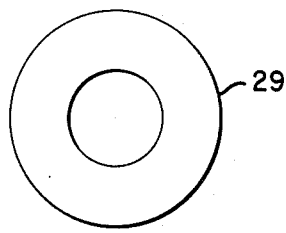
Fig. V
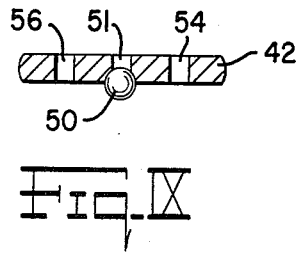
Fig. IX
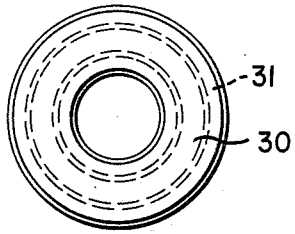
Fig. VI
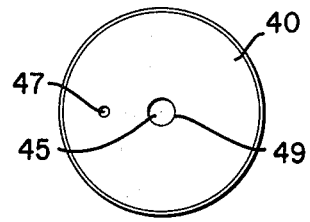
Fig. X
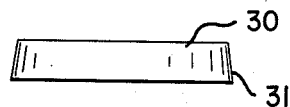
Fig. VII
INVENTOR.
GEORGE W. LEWIS
BY
*Falvey, Souther & Stoltenberg.*
ATTORNEYS

United States Patent Office 3,218,022
Patented Nov. 16, 1965

3,218,022
ADJUSTABLE SOLENOID OPERATED VALVE
George W. Lewis, Toledo, Ohio, assignor, by mesne assignments, to General Precision, Inc., Tarrytown, N.Y., a corporation of Delaware
Continuation of application Ser. No. 28,770, May 12, 1960. This application Mar. 17, 1964, Ser. No. 353,316
14 Claims. (Cl. 251—30)

The present application is a continuation of copending application 28,770, filed May 12, 1960, and now abandoned.

This invention relates to control means for fluid flow, and more specifically, though not exclusively, to electro-hydraulic valves having high speed valve response.

The invention comprehends a valve assembly of the module or building block concept in design which may be built into a system or into a hydraulic device adapted to control a hydraulic circuit.

The invention contemplates an electrically-controlled valve wherein its movable components are constructed and arranged so as to provide a very high speed valve response to a low energy electrical signal.

The invention embraces a pilot type hydraulic valve controlled by a solenoid wherein its windings are effectively sealed from the hydraulic fluid and wherein the solenoid is readily adjustable and sealed in position providing a leak-proof construction.

The invention includes a valve construction of extremely compact and light weight which is particularly adapted to miniaturized systems for aircraft and missile use.

The invention comprises a new and improved electro-hydraulic valve including a unitary electromagnetic assembly that can be readily removed from the housing whereby the components of the valve proper are accessible for inspection and replacement.

The invention includes a valve assembly providing a readily adjustable valve lift arrangement which permits a valve to be set to produce optimum pressure range and flow for a particular application.

This invention also includes a novel electro-hydraulic valve of the pilot type wherein the movable components are of low mass to provide a very high speed valve response and which is leak-proof in its closed position.

According to the foregoing summary of the invention indicating its nature and substance, one of the main objectives is the provision of an electro-hydraulic valve of the pilot type utilizing components of thin cross-section and of very low mass to provide a very high speed valve response to an electric signal and a leak-proof construction particularly while in its closed position.

The electro-hydraulic valves that are commercially available are more or less of a specialized character designed to meet specific uses. However, to date, there is a lack of vibration-proof, fluid-tight, high-speed valves of small dimension and light weight which are consistent and reliable in performance under severe service conditions, particularly in installations where the fluid pressure may vary and in environments where broad changes of temperature are encountered. Therefore, it is the primary object of this invention to provide a valve having a very high speed valve response, highly reliable and consistent in its operation under severe service conditions and particularly adaptable for use in various types of installations where small size and light weight are primary considerations.

One object of the invention is the provision of a valve structure of the module or building block design that can be removed from the hydraulic system without disturbing the hydraulic circuit connections.

Another object of the invention is to provide a hydraulic composite unit valve assembly wherein the components may be arranged to suit different types of installations by utilizing unitary sub-assemblies which do not require skilled operators or the use of special tools for their installation as a composite unit.

Another object of the present invention, which enhances the universality of the valve, is to arrange the solenoid windings and core as a unitary assembly that can be installed and sealed as well as removed as a separate unit, so that the same may be used in waterproof, air-proof housings or enclosures in association with the components of the valve proper.

Another object of the invention is the provision of an electromagnetic valve, which is very reliable in operation either in its upright or inverted positions, and of extremely compact and light weight, particularly adaptable for use in aircraft and missiles where consideration of space and weight are paramount.

Another object of the invention is the provision of a valve wherein the movable components are of very low mass whereby high speed valve response is obtained under any service conditions.

Another object of the invention is to provide an electro-hydraulic valve where the number of parts is reduced to a minimum and all are designed so as to be readily manufactured on a mass production basis.

A further object of the invention resides in the arrangement of a valve structure wherein the valve member is of thin cross-section and has means for providing pressure imbalance on opposite sides thereof to thereby cause the sealing of the valve member without leakage and wherein, due to its thin cross-section, the valve member is capable of some conformability to a slight distortion of the valve seat.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

Referring to the drawings:

FIG. I is a top plan view of an electro-hydraulic valve embodying the invention;

FIG. II is a cross-sectional taken in lines II—II of FIG. I looking in the direction of the arrows showing the embodiment of the invention with the valve components in normally closed position;

FIG. III is an elevational view of the detachable electromagnetic sub-assembly shown in FIG. II with a portion broken away and with the insulating cover removed;

FIG. IV is a top plan view of the sub-assembly shown in FIG. III;

FIG. V is a top plan view of the retainer for the windings and pole piece end plate;

FIG. IV is a top plan view of the sealing member and spring retainer of the electromagnetic sub-assembly;

FIG. VII is a side elevational view of the sealing member and spring retainer shown in FIG. VI;

FIG. VIII is a top plan view of the armature or control member and pilot valve assembly;

FIG. IX is a cross-sectional view of the armature taken in line IX—IX of FIG. VIII looking in the direction of the arrows; and FIG. X is a top plan view of the main valve member.

In the drawings, for purpose of illustration, the features of the invention are shown as embodied in an electrically-controlled valve for establishing or stopping the flow of fluids. However, it should be clearly understood that the principles and features of the invention are believed to be applicable to other types of fuel flow control devices and that the invention, therefore, should not be limited to the form shown because it is contemplated to use the same whenever the invention may be found to be of utility.

Referring particularly to FIG. II of the drawings, the valve comprises a hollow metallic shell or an elongated housing 10 of magnetizable material having a closed end 12 and an open end 14 providing an axial bore of a longitudinal cylindrical chamber of substantially uniform diameter throughout its length. The closed end 12 of the housing has a centrally-located out port or outlet means 15 and radially-spaced in ports or inlet means 16 providing the passage to be controlled by the valve.

The open end 14 of the housing is arranged to be closed by the electro-responsive means used to control the flow of fluid through the housing passage. This means is shown in the form of a solenoid or electromagnetic means 17 having an adjustable connection with the housing formed by the threaded section 18 located at its open end and the threaded section 19 formed on the outer wall of the enlarged section of the electromagnetic means. As shown in FIG. III, the electromagnetic means 17 preferably takes the form of a sub-assembly adapted to be installed, as a unit, and that can be readily removed from the housing 10 whereby the valve components are accessible for inspection and replacement. The electromagnetic means 17 comprises a central magnetizable core or pole piece 20 surrounded by suitable windings or energizing coil 21. The ends of the coil 21 are connected respectively to terminal posts or connectors 23 and 24 maintained in insulated and rigid position through insulating bushings 25 and 26 located in spaced apertures 28 and 28' provided in the enlarged upper end of the magnetic core. The pole piece 20 has, at its lower end, a reduced portion 27 providing a shoulder having in abutting relation thereagainst a non-magnetizable washer 29 or the retainer for holding the windings 21 in position. The retainer washer 29 also provides, by its tight engagement with the reduced portion 27 of the pole piece, a thrust end-plate for the sealing member 30.

One of the features of the invention is to provide a hydraulic valve controlled by a solenoid, wherein the windings are effectively sealed from the hydraulic fluid in any position of adjustment providing a leak-proof, adjustable construction of the dry coil type. In order to secure this construction, the sealing member 30 is of annular configuration and U-shaped cross-section, made of distortable, rubber-like material, capable of withstanding hydraulic fluids and high temperature without impairment, and is dimensioned to snugly fit the reduced portion 27, and provides, with its outer leg portion, a sealing lip 31 having radial interference with the bore of the housing whereby its sealing action increases as the fluid pressure within the housing increases.

The lower end of the electromagnetic sub-assembly 17 forms with the closed end 12 of the housing 10, an adjustable component of a fluid-containing or valve chamber 34 arranged for communication with the outlet and inlet means 15, 16, piercing the wall defining the closed end of the housing. The bottom wall of the chamber 34 is formed by a uniplanar surface provided with an intermediate circular groove 35 in communication with the inlet passages 16 and has a shallow recess 37, preferably located at its outer periphery. The groove 35 and the peripheral recess 37 are concentrically arranged to provide an annular planar surface surrounding the perimeter of the outlet port 15 forming the outlet valve seat 38 and an annular land or secondary valve seat 39 surrounding the inlet passages 16. The valve seats 38 and 39 are normally engaged by the valve member 40 dependent for functioning upon the position of the armature or control member 42 which is arranged to normally urge the valve member 40 to valve seat engaging position.

One of the important features of the invention resides in forming the movable components of the valve comprising the valve member 40 and its control member or armature 42 of low mass to thereby obtain high speed of valve response upon the production of an electrical signal causing the energization of the electromagnetic means 17. In the embodiment shown, the valve member 40 is made of non-magnetic material, preferably from non-ferrous alloys such as aluminum-bronze, and takes the form of a thin plate or disk, in which its planar dimension or diameter is considerably greater than its thickness. The valve member 40 is dimensioned to extend across the valve chamber 34, so that its periphery lies contiguous to the vertical walls thereof, providing freedom of movement, preferably a close sliding fit therewith. The valve member 40 is traversed by a pilot port 45 in alignment with the outlet port 15 and also with a pressure balance port or fluid passageway 47 located in flow communication with the inlet passages 16 through the groove 35.

The pilot port 45 is dimensioned to provide a greater flow than the flow capacity of the fluid pressure balancing passage 47, and has a valve seat 49 on its rear face which is normally engaged and thereby closed by a pilot valve which preferably takes the form of a ball member 50 permanently fixed to the control member 42, preferably by pressing the same in the central aperture 51.

The control member 42, constituting the armature or movable component of the magnetic circuit of the electromagnetic means 17 is made of high permeability magnetic material in the form of a flat plate or disk having a thin cross-section substantially smaller than its diameter, and is dimensioned to extend across the chamber 34, so that its periphery lies contiguous to the lateral walls of the chamber providing slightly greater clearance than the clearance provided for the valve member 40. The control member 42 is traversed by a plurality of spaced apertures or fluid passages 54, 55, 56, and 57, each located at substantially the same radial distance as the pressure balancing passageway 47 traversing the valve member 40.

In the embodiment shown, biasing means acting on the control member 42 are provided to cause the auxiliary or ball valve 50 to engage the valve seat 49 and, in turn, urge the valve member 40 into engagement with the valve seats 38 and 39. Suitable yielding or resilient means are contemplated to perform the biasing function and, as particularly shown in FIG. II, this means takes the form of a coil or compression spring 60 dimensioned to provide an initial preload and having its upper end nested within the bight portion of the U-shaped sealing member 30 whereby lateral displacement is avoided and the spring 60 is maintained in a fixed central position to apply its biasing force to the control member at substantially the same radial distance from the central axis of the ball valve 50. Thus it can be seen that the sealing member 30 not only provides a leak-proof seal for the adjustable portion of the chamber 34 but, in addition, serves as an effective guiding means to constantly maintain the compression spring 60 in a central position.

It should be noted that when the valve member 40 is in its closed position, as shown in FIG. II, the distance between the armature 42 and the end of the pole piece 27 represents the lift of the pilot valve 50, and that such distance can be changed very readily through the threaded connection 18–19 provided between the magnetic actuator 17 and housing 10 by turning one with respect to the other. In order to readily facilitate this adjustment, the magnetic actuator unit 17 has at its top surface a transverse slot 62 arranged to accommodate a suitable turning tool such as a screwdriver. The top surface of the magnetic actuator 17 is also provided with a threaded aperture 63 for receiving the screw 64 which serves to detachably retain an insulating cap 65 provided with suitable openings, for the passage of the terminals 23 and 24 to thereby aid in maintaining them in insulated fixed position in the assembly. Moreover, the cap 65, through the frictional connection of its depending walls 67 with the open end of the housing, provides locking means to prevent accidental turning of the electromagnetic means 17.

The outer surface of the housing located near its closed end has a hexagonal portion 70 for receiving a tool for use both in the assembly of the valve structure, as well as in the installation of the valve housing to suitable fluid circuit connectors adapted to be interposed in a fluid circuit which is controlled by the valve. At the end of the hexagonal portion 70, the outer surface of the housing is formed with a cylindrical enlarged portion 73 which merges into an inwardly tapering section 74 connected to the depending boss or threaded nipple 75 which comprises the threaded section 76 and a reduced end portion 78 forming the attaching means for the valve housing to a suitable fluid connector.

As shown in FIG. II, the fluid connector takes the form of a metallic block provided with spaced inlet and outlet threaded connectors 80 and 81 in communication with the vertical bore 82. The open end of the bore 82 has an enlarged section arranged to accommodate the circular portion 73 of the housing and forms a shoulder 84 for retaining a suitable seal 85 bearing against the tapering section 74 of the housing. The bore 82 is provided with threads 87 receiving the threaded section 76 of the housing and is provided with a smooth section 88 connected to a portion of smaller diameter 89 forming the tapering shoulder 90 adapted to receive a sealing member 91 for tight engagement with the reduced portion 78 of the housing nipple 75. The sealing members 85 and 91 prevent leakage between the inlet passages 16 in communication with the fluid threaded connector 80, as well as with the outlet passage 15 in communication with the bottom section 89 of the bore 82 and the discharge or outlet threaded connector 81.

An important feature of the invention is to provide an electromagnetic assembly wherein the energizing windings can be effectively changed, so that the valve may be capable of operating at different voltages. In the embodiment shown, energizing coil 21 of the electromagnetic means 17 may be removed from the magnetizable core or pole piece 20 by removing the retainer 29 which is pressed on the reduced section 27 of the pole piece. Thus this arrangement provides simple and practical means for the substitution of windings whereby the valve may operate at different voltages.

In addition, it should be noted that the components of the electromagnetic assembly, and particularly those of the movable elements of the valve structure, are of very simplified design, having configurations where weight is considerably reduced without impairing their efficient operation. The arrangement disclosed is of such nature that with minor changes in the valve or control members, the characteristics of the valve can be tailored to meet special conditions of service whereby the universality of the valve of the invention is readily secured.

The operation of the form of the invention hereinbefore described is such that the movable components 40 and 42 of the valve structure are normally in closed position interrupting the flow of fluid through the housing. Whenever the solenoid coil 21 is not energized, the movable components, as shown in FIG. II, are in closed position whereby the valve member 40 is in tight engagement with the outlet valve seat 38, as well as the secondary annular valve seat 39. When the valve member 40 is in closed position, the fluid pressure prevailing in the inlet passages 16 is transferred, through the fluid passageway 47, to be effective on the top face of the valve member 40 and thereby hold the same tightly on the valve seats 38 and 39 under the effective pressure differential caused by the differential in the area of the top face acted upon by the inlet pressure with respect to the area of the bottom face of the valve member 40. The inlet pressure is also transferred to the top surface of the armature or control member 42 through traversing passageways 54, 55, and 56 and thereby is effective to hold the ball valve 50 in its closed position tightly against the pilot port valve seat 49. This is secured by the fact that the upper face of the armature provides a larger effective area than its lower face, creating an effective pressure differential. In addition, the control member 42 is normally urged to its closed position by the preloading of the spring 60 interposed between the control member 42 and the transverse stationary component 30 of the electromagnetic sub-assembly.

Upon the application of an electric signal providing the proper current value for the energization of the coil 21, the magnetizable control member 42 will be attracted against the action of the spring 60 unseating the ball valve 50 from valve seat 49 and thereby open the pilot port 45, as well as compressing the spring 60. Since the effective area of the top face of the valve member 40 acted upon by the inlet pressure is greater than the effective area of lower face when the valve member is in seated or closed position, the releasing of the pressure from its top face, caused by the escapement of fluid through the pilot port 45, will cause a pressure or hydraulic imbalance condition whereby the valve member moves upwardly in the chamber and opens the communication between the inlet means 16 and the outlet port 15, allowing the flow of fluid through the valve from the inlet passages 16 to the outlet port 15.

If the solenoid winding 21 is deenergized by interrupting the electrical signal, the spring 60 and hydrostatic pressure within the chamber 34 return both the armature 42 urging the pilot ball valve 50, as well as the valve disk 40 to their respective seats, thereby closing the passage for the flow of fluid from the inlet means 16 to the outlet port 15.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and is it not intended to limit the scope of the following claims beyond the requirements of the prior art.

Having described my invention, what I claim as new and desire to secure by Letters Patent is:

1. A fluid flow control valve comprising:
   a housing having a chamber open to line fluid pressure when the valve member is in closed position;
   central outlet and surrounding inlet means connected to said chamber;
   valve seat means intermediate said inlet and outlet means;
   an auxiliary valve seat surrounding said inlet means;
   a valve member of thin cross section constructed and arranged to extend across said chamber so that its periphery lies contiguous to the lateral walls of said chamber;
   pressure-balancing passage means traversing said valve member in flow communication with said inlet means to provide fluid pressure equalization on the opposite side thereof;
   a pilot port traversing said valve member in alignment with said outlet means providing a greater flow than the flow capacity of said pressure-balancing passage means;
   a valve seat for said pilot port provided by said valve member;

a disk-like control member, traversed by radially-spaced apertures and fixedly carrying a pilot ball valve projecting centrally from one side thereof;

biasing means operative through said control member to urge said pilot ball valve into engagement with the valve seat of said pilot port and said valve member into engagement with said intermediate valve seat means and the auxiliary valve seat to close said outlet means;

and means in said housing operable to move said control member with said pilot ball valve against the action of said biasing means thus enabling movement of the valve member out of engagement with said intermediate valve seat means an auxiliary valve seat to allow the flow of fluid through said chamber.

2. A fluid flow control valve comprising:

a housing having a chamber of cylindrical configuration closed at one end by a uniplanar wall;

a centrally-located port and a radially-spaced port traversing said uniplanar wall to provide outlet and inlet means into said chamber;

a valve member of thin cross-section constructed and arranged so that its periphery lies contiguous to the lateral walls of said chamber;

valve seat means intermediate said centrally-located and radially-spaced ports formed on the uniplanar wall of the chamber;

an auxiliary valve seat surrounding the radially-spaced port formed on the uniplanar wall of the chamber;

a port traversing said valve member in flow communication with said radially-spaced port for the application of fluid pressure on opposite sides of the valve member;

a pilot port in alignment with said centrally-located port traversing the valve member;

a control member of thin cross-section constructed and arranged so that its periphery lies contiguous to the lateral walls of said chamber;

passage means traversing said control member for the application of fluid pressure on opposite sides thereof;

a pilot valve fixedly carried by said control member in alignment with said pilot port;

means acting on said control member to urge said pilot valve into engagement with said pilot port and urge said valve member into engagement with said intermediate valve seat and said auxiliary valve seat;

and means in said housing operable to move said control member away from said valve member and thereby open the pilot port.

3. In combination, a housing open at one end and closed at one end by a uniplanar surface;

an adjustable electromagnetic assembly comprising a central magnetizable core surrounded by energizing windings arranged to close the open end of said housing to form an adjustable chamber for containing fluid;

means defining centrally-located port and a radially-spaced port traversing said uniplanar surface and respective valve seat means surrounding said ports providing controllable outlet and inlet means into said chamber;

annular sealing means in said chamber cooperating with said core and the lateral walls of said housing for sealing said energizing windings in adjusted position against fluid in said chamber;

a movable magnetizable armature;

a movable non-magnetizable valve member of thin cross section and low mass depending for its function upon the position of said armature with respect thereto;

a pilot port and an additional port traversing said valve member in flow communication, respectively, with said centrally-located and said radially-spaced port;

a pilot ball valve fixedly carried by said armature projecting from one side thereof;

spring means engaging said sealing means and said armature for urging said pilot ball valve into engagement with said pilot port to cause said valve member to engage both said respective valve seat means;

and means to energize said windings to attract said armature against the action of said spring and thereby move said pilot ball valve out of engagement with said pilot port.

4. A fluid flow control valve comprising:

housing means enclosing a chamber bounded by an endwall and lateral walls;

means defining a fluid outlet passage in flow communication with said chamber terminating in an outlet port in the inner surface of said endwall at a location spaced from said lateral walls;

fluid inlet means in said endwall disposed around said outlet port;

means defining on the inner surface of said endwall one valve seat, surrounding said outlet port and located intermediate said outlet port and inlet means, and an additional valve seat surrounding said inlet means;

a valve member of rigid construction freely movably disposed in said chamber and adapted, at the limit of its movement toward said endwall, to engage both of said valve seats, said valve member containing a pilot port and a passage laterally-spaced from, and of lower flow capacity than, said pilot port, said pilot port and said passage being in flow communication with said outlet port and inlet means, respectively, at all times regardless of the position of said valve member relative to said endwall and lateral walls;

a ported control member of the same general configuration and construction as said valve member, freely movably disposed in said chamber in juxtaposition to said valve member so that the valve member lies between the control member and said endwall, said control member carrying a valve ball member projecting therefrom in the direction of said endwall and adapted to seat in and close said pilot port when said control member is moved toward said valve member;

means resiliently urging said control member toward said endwall whereby said valve ball member seats in said pilot port and urges said valve member into engagement with said one and said additional valve seats;

and means selectively operable to move said control member in a direction away from said endwall against the effect of said urging means.

5. A fluid flow control valve comprising:

housing means enclosing a cylindrical chamber bounded by an endwall and lateral walls;

means defining a fluid outlet passage through said endwall terminating in an outlet port in the inner surface of said endwall at a point centrally-located with respect to said lateral walls;

means defining on said inner surface of the endwall a pair of radially-spaced, co-planar valve seats concentrically surrounding said outlet port and a plurality of inlet passages through said endwall terminating at said inner surface thereof at spaced points located between the valve seats;

a discoid valve member of slightly smaller diameter than said chamber freely movably disposed in said chamber adjacent, and substantially parallel to the plane of, said endwall, said valve member containing a central pilot port, of smaller area than said outlet port, and an eccentric pressure-balance port, of smaller area than said pilot port, radially-spaced from the center of the valve member by an amount intermediate the radial distance between said co-planar valve seats;

a discoid control member, of substantially the same diameter as the valve member, freely movably disposed in said chamber with one face in confronting relation to that face of the valve member remote from said endwall and having a valve ball member, projecting concentrically from said one face, adapted to seat in the pilot port in said valve member, said control member further containing a plurality of axial ports radially spaced from the center thereof;

means resiliently urging said control member toward said endwall whereby said valve ball member seats in said pilot port and urges said valve member into engagement with said co-planar valve seats;

and electromagnetic means selectively operable to move said control member in a direction away from said endwall against the effect of said urging means.

6. A fluid flow control valve comprising:

an elongate housing member having an endwall and substantially cylindrical sidewalls;

electromagnetic operating means disposed in said housing and occupying a major portion of the length thereof remote from said endwall, said operating means including a solenoid winding and coaxial core jointly and individually adjustable with respect to longitudinal position in said housing;

annular sealing means disposed about the end of said core proximate said endwall and coacting with said endwall and the sidewalls of said housing member to define a cylindrical valve chamber sealed from said major portion of the housing member;

means defining on the inner surface of said endwall a pair of annular, coplanar, concentric valve seats spaced by an intermediate annular groove;

means defining a fluid outlet passage and a plurality of fluid inlet passages in said endwall, said outlet passage terminating at one end in an outlet port in said inner surface of the endwall concentrically located with respect to said concentric valve seats, said inlet passages terminating at respective ends in equispaced ports in said annular groove;

a discoid valve member, of low mass, small thickness dimension and having a diameter slightly smaller than the interior of said valve chamber, coaxially disposed in said chamber adjacent said endwall, said valve member being displaceable toward and away from said endwall, movement toward said endwall being limited by simultaneous engagement of the valve member with said concentric valve seats, said valve member having a central pilot port, in registration with said outlet port, and a pressure balance port, of small area as compared to the pilot port, in flow communication with said groove;

a discoid control member, of magnetic material, having a diameter similar to that of said valve member, coaxially disposed in said chamber between the valve member and said sealing means, said control member containing a plurality of apertures and having concentrically located on its face in opposition to the valve member, a hemispheroidal projection adapted to seat in said outlet port, said control member being displaceable toward and away from said valve member, displacement toward said valve member being limited by seating of said spheroidal projection in said outlet port, and displacement away from said valve member being limited by abutment with said end of the solenoid core;

and compression spring means acting between said sealing means and control member and effective, in the absence of energization of said solenoid winding, to maintain said control member in its limit position of displacement toward said endwall and, by virtue of seating of said spheroidal projection in said outlet port, to maintain said valve member in engagement with said concentric valve seats.

7. A fluid flow control valve comprising:

a housing member defining a chamber having first and second opposite faces;

an inlet port and an outlet port in flow communication with said chamber, said outlet port being in axial alignment with said housing member;

means defining at least one valve seat for said inlet port and said outlet port;

a valve member of rigid construction freely movably disposed in said chamber and adapted, at the limit of its movement towards said first face, to engage said at least one valve seat, said valve member containing a pilot port in axial alignment with said housing member and a pressure balancing passageway spaced from, and of lower capacity than, said pilot port, said pilot port and said pressure balancing passageway being in flow communication with said outlet and inlet ports, respectively, at all times regardless of the position of said valve member relative to said first face;

a control member of rigid construction freely movably disposed in said chamber in juxtaposition to said valve member so that the valve member lies between the control member and said first face, said control member carrying an auxiliary valve member projecting therefrom in the direction of said first face and adapted to seat in and close said pilot port when said control member is moved toward said valve member, and said control member being formed of high permeability material and comprising a planar disk having a thin cross-section substantially smaller than the diameter thereof traversed by a plurality of spaced apertures, each of said apertures located at substantially the same radial distance as said pressure balancing passageway traversing said valve member;

means resiliently urging said control member towards said first face whereby said auxiliary valve member seats in said pilot port and urges said valve member into engagement with said at least one valve seat; and solenoid means selectively operable to move said high permeable control member in a direction towards said second face against the effect of said urging means.

8. A fluid flow control valve comprising:

a housing having a chamber open to line fluid pressure when the valve member is in closed position;

control outlet and laterally displaced inlet means connected to said chamber;

at least one valve seat for said outlet and inlet means;

a valve member exhibiting a predetermined cross section constructed and arranged to extend across said chamber so that its periphery lies contiguous to the lateral walls of said chamber, and having a pilot port therethrough in alignment with said outlet means;

pressure-balancing passage means traversing said valve member in flow communication with said inlet means to provide fluid pressure equalization on the opposite side thereof;

a valve seat for said pilot port provided by said valve member;

at least one magnetic control member exhibiting a predetermined cross section constructed and arranged to extend across said chamber so that its periphery lies contiguous to the lateral walls of said chamber including a radial port and fixedly carrying a pilot valve projecting centrally from one side thereof, said control member being formed of high permeability material and comprising a planar disk having a thin cross-section substantially smaller than the diameter thereof and said at least one radial port being located at substantially the same radial distance as said pressure-balancing passage means traversing said valve member;

biasing means operative through said control member to urge said pilot valve into engagement with the valve seat of said pilot port and said valve member into engagement with said at least one valve seat;

and selectively operable magnetic means positioned in said housing for moving said control member with said pilot valve against the action of said biasing means thus enabling movement of the valve member out of engagement with said at least one valve seat to allow the flow of fluid between said inlet and outlet means.

9. An adjustable solenoid operated valve comprising:

a housing having a chamber open to inlet fluid pressure when the valve is in a closed condition;

central outlet and spaced inlet means connected to said chamber;

valve seat means for said inlet and outlet means;

a non-magnetic planar valve member positioned within said chamber the periphery of which lies contiguous to the lateral walls of said chamber;

pressure-balancing passage means traversing said valve member coupled to said inlet means to provide fluid pressure equalization on the opposite side of said valve member;

a pilot port traversing said valve member in alignment with said outlet means providing a greater fluid flow than the fluid capacity of said pressure-balancing passage means;

a valve seat for said pilot port provided by said valve member;

a magnetizable planar control member fixedly carrying an auxiliary pilot valve on one side thereof having a plurality of radially spaced pressure-balancing passage means traversing therethrough to provide fluid pressure equalization on opposite sides of said control member, said control member being formed of high permeability material and comprising a planar disk having a thin cross-section substantially smaller than the diameter thereof and said plurality of pressure-balancing means traversing therethrough being located at substantially the same radial distance as said pressure-balancing passage means traversing said valve member;

means positioning said non-magnetic valve member intermediate said outlet means and said magnetizable control member;

biasing means operable to urge through said control member said auxiliary pilot valve into engagement with said pilot port valve seat and said valve member into engagement with said valve seat means to close said outlet means;

and a solenoid in said housing selectively energizable to attract said control member and thereby move said control member with said pilot valve against the action of said biasing means and opening said pilot valve, fluid flow through said pilot valve resulting in a fluid pressure differential across said valve member to thereby displace said valve member from said valve seat means to allow the flow of fluid between said inlet and outlet means.

10. The valve of claim 9 wherein said valve member is displaced, fluid flows from said inlet means through said chamber to said outlet means.

11. The valve of claim 9 wherein when said valve member is displaced, fluid flows directly between said inlet and outlet means.

12. The valve of claim 9 wherein the position of said solenoid in said housing is adjustable to provide a predetermined valve lift force to produce optimum pressure range and flow for a specific application.

13. The valve of claim 9 wherein the biasing means, upon deenergization of said solenoid, urges through said control member said pilot valve into engagement with said pilot port seat resulting in a fluid pressure differential across said valve member to thereby force said valve member into engagement with said valve seat means to close said outlet means.

14. The valve of claim 13 wherein said fluid pressure differential increases as said valve member approaches said valve seat means.

References Cited by the Examiner

UNITED STATES PATENTS

| | | | |
|---|---|---|---|
| 1,342,641 | 6/1920 | Moreton | 251—148 X |
| 1,961,599 | 6/1934 | Schwitzer et al. | 251—30 X |
| 2,294,421 | 9/1942 | Ray | 251—148 X |
| 2,379,181 | 6/1945 | Pontius et al. | 251—30 |
| 2,588,137 | 3/1952 | Marvin | 251—141 X |
| 2,629,401 | 2/1953 | Miller | 251—30 |
| 2,738,157 | 3/1956 | Vargo | 251—30 |
| 2,828,936 | 4/1958 | Hales | 251—141 X |
| 2,911,183 | 11/1959 | Matthews et al. | 251—337 X |
| 2,931,619 | 4/1960 | Anderson | 251—139 |
| 2,964,286 | 12/1960 | Hoskins | 251—30 |

FOREIGN PATENTS 586,658   12/1958   Italy.

M. CARY NELSON, *Primary Examiner.*